Aug. 15, 1939.  H. F. PITCAIRN  2,169,849
AIRCRAFT WITH ROTATIVE SUSTAINING BLADES
Filed Jan. 8, 1938
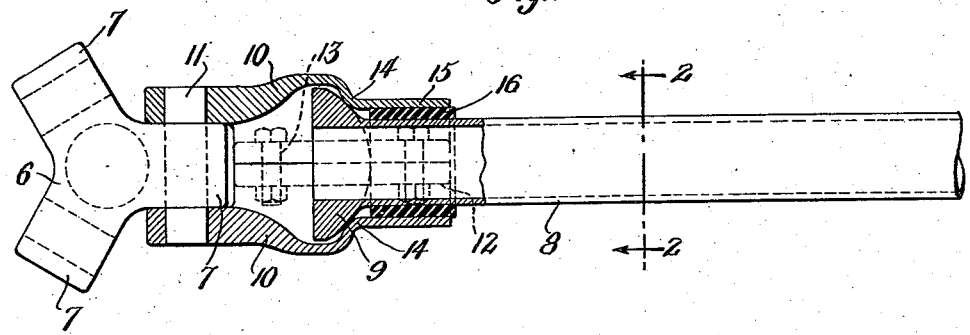
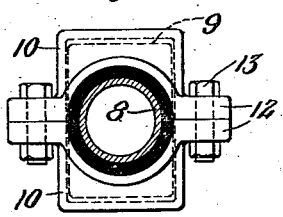
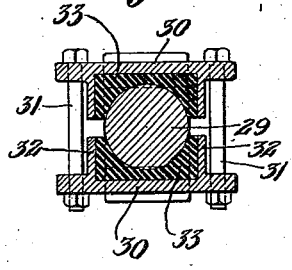
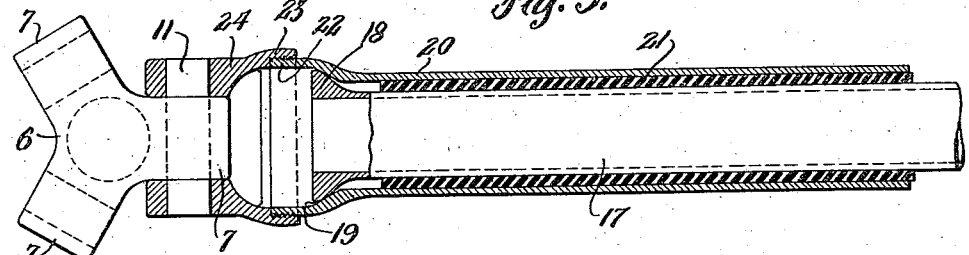
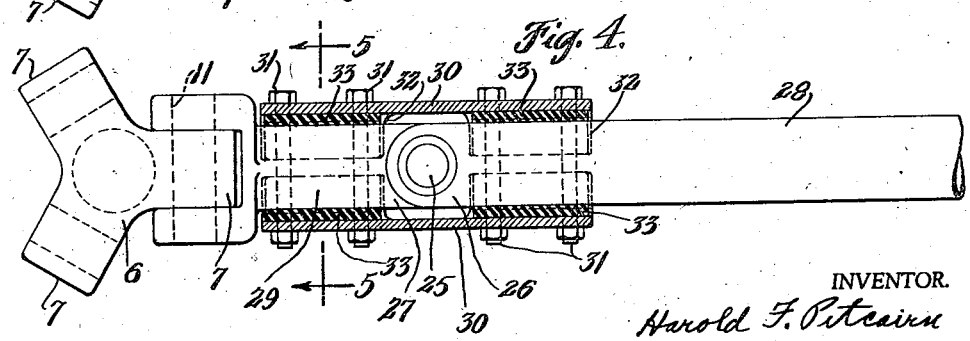
INVENTOR.
Harold F. Pitcairn
BY
Synnestvedt & Lechner
ATTORNEYS.

Patented Aug. 15, 1939

2,169,849

UNITED STATES PATENT OFFICE 2,169,849

AIRCRAFT WITH ROTATIVE SUSTAINING BLADES

Harold F. Pitcairn, Bryn Athyn, Pa., assignor, by mesne assignments, to Autogiro Company of America, a corporation of Delaware Application January 8, 1938, Serial No. 183,925

6 Claims. (Cl. 244—18)

This invention relates to sustaining rotors for aircraft and especially to sustaining rotors capable of autorotation and having some degree of freedom for individual blade movement with respect to the hub, (examples of the autorotatable type of rotor being disclosed in Patent No. 1,985,- 819 issued December 25, 1934, to Juan de la Cierva).

In prior practice, rotors of this general type have frequently incorporated several hinges or mounting pivots for each blade, including a "drag" pivot by means of which the blade is given freedom for at least some degree of lag and lead movement generally within the rotative path of travel thereof.

The invention is particularly concerned with a novel type of joint or connection especially adapted to be used in place of the drag hinge of prior practice, although it may be used in place of one or more hinges generally, or else in conjunction therewith.

One of the important objects of the invention is the provision of a yieldable or cushioning connection at the blade root whereby to give the blade the small degree of freedom for lag and lead movements required in flight (about 1° to 2° each side of center) and at the same time afford a means for absorbing vibrations and the like.

Although the arrangement of the invention may be applied to existing rotors incorporating a drag hinge or pivot, in accordance with the invention it is possible even to eliminate the usual drag hinge, as will appear more fully hereinafter.

A further advantage of the invention flows from the fact that only very small lag and lead movements of the blade are permitted by my improved arrangement, in view of which, the application of a driving torque to the rotor, as when speeding up the rotor prior to take-off, does not cause substantial angular displacement of the blade.

The nature, objects and advantages of the invention will be still more apparent from a consideration of the following description referring to the accompanying drawing, in which—

Figure 1 is a top plan view of a rotor hub and the root end of an associated blade, with certain parts shown in horizontal section;

Figure 2 is a transverse sectional view taken as indicated by the section line 2—2 on Figure 1;

Figure 3 is a view similar to Figure 1 but illustrating a modified construction;

Figure 4 is also a view similar to Figure 1 but showing a further modified arrangement in which the invention is applied to a rotor blade mounting of existing type incorporating a drag pivot; and Figure 5 is a cross sectional view on the line 5—5 of Figure 4.

In Figure 1, the hub is shown at 6, this hub having three apertured lugs 7 for the attachment of three blades, although it will be understood that any desired number of blades may be employed. In accordance with the invention the blade is provided with a root end fitting 8 having at its inner end an enlargement or bearing 9 with a bearing surface generally of semi-cylindrical shape, the axis of which is generally upright. Alternatively, the bearing 9 may be formed at the root end of the blade spar itself. This enlargement is housed between the two halves 10—10 forming an extension link which is connected with one of the hub lugs 7 by means of a pivot 11. The two parts of the extension link housing are provided with opposed flanges 12 which may be secured together by bolts 13.

At the outer side of the bearing 9, the housing is provided with a reduced portion 14 at each side of the fitting 8 presenting a rounded vertical ridge to the semi-cylindrical surface of the bearing 9. By this means the root end fitting 8 for the blade is permitted freedom for some rocking movement about the generally upright axis of the bearing. This arrangement, therefore, provides for lag and lead movements of the blade.

The housing 10—10 further includes a sleeve portion 15 extended outboard of the bearing 9 in spaced relation to the blade root fitting 8 and a ring or sleeve of yieldable material 16 is interposed between these telescopically associated parts. Rubber or some rubber compound may be employed as the yieldable material or, if desired, Neoprene may be employed, this material being of advantage in this situation because of its high hysteresis.

In connection with the arrangement of Figures 1 and 2, it may be noted that the semi-cylindrical shape of the bearing 9 prevents rotation of the blade about its own longitudinal axis. Maintenance of the desired pitch position of the blade is therefore assured in flight.

In the modified form shown in Figure 3, the blade root fitting or spar 17 is provided at its inner end with a semi-spherical enlargement or bearing 18 which cooperates with the inner annular surface 19 of the sleeve 20 in a manner to give freedom for movement of the blade universally. When employing the spherical type of bearing of Figure 3, the surface 19 is preferably made either flat or at least concavely curved on a radius larger than the radius of the semi-spherical bearing 18.

Relative angular movement of sleeve 20 and blade root 17 is resisted by the interposition of yieldable material 21.

At its innermost end, the sleeve 20 has a threaded portion 22 cooperating with the threaded part 23 of mounting member 24, which is connected to one of the hub lugs by means of pivot 11 as in Figure 1. This threaded joint 22—23 is provided for the purpose of facilitating assembly and the like.

As hereinbefore indicated, the arrangement of Figures 4 and 5 illustrates the manner in which the invention may be applied to existing blade mountings incorporating a drag hinge or pivot 25. As here shown, this pivot cooperates with apertured ears 26 and 27 formed respectively on the root end fitting 28 and extension link 29. At its inner end, as before, the extension link is coupled to the hub by means of a flapping pivot 11.

In Figures 4 and 5 it will be seen that a pair of bracket plates 30—30 embraces the root end of the blade and extends both inboard and outboard of the axis of drag hinge 25. The cross sectional shape of these brackets may be clearly seen in Figure 5, the pair being bolted together as at 31. Each bracket is equipped with flanges 32—32 providing a socket for the reception of a resilient or yieldable block of material 23.

When assembled with the bolts 31 drawn up to place the yieldable material under compression, movement of the blade about the drag hinge 25 is very materially restricted.

In all forms illustrated it will be seen that a pair of telescopically arranged members is disposed at the blade root and provided with interposed resilient or yielding material for the purpose of cushioning blade movements. In the forms of Figures 1 to 3, the two sleeves at the blade root are complete, whereas in the arrangement of Figures 4 and 5, the brackets 30 in effect constitute a split sleeve.

In all forms, in addition to providing cushioning action as above noted, there are provided interengaging metallic bearing surfaces through which the thrust of centrifugal force is transmitted from the blade to the hub. Thus the cushioning action is obtained without the necessity for carrying the thrust of centrifugal force through the yieldable material.

The arrangements of Figures 1 to 3 are especially advantageous also because of the material simplification of structure, as compared with prior arrangements incorporating a drag pivot. Still further, it may be noted that in accordance with prior practice, it has been common to employ a blade movement controlling device in association with the drag pivot. The yieldable material associated with the blade root in all forms of this invention is a much simpler expedient than the damper or control devices heretofore employed.

In accordance with the showing of Figure 1, the cylindrical shape of the bearing 9 and its cooperating ribs 14 provides a means for restraining the blade as against all movement except in the lag and lead sense with respect to the housing 10—10. In this form the resilient sleeve 16 may therefore be quite short.

In Figure 3, on the other hand, the ball and socket type of mounting 18—19, permits limited movement of the blade in all directions with respect to the sleeve 20 and mounting member 24 and, co-incidentally, affords absorption of vibrations substantially in any direction. In this case rotation of the blade about its own longitudinal axis is prevented by employing a relatively long resilient sleeve 21, the interengagement of the resilient material with the root end fitting 17 and the sleeve 20 being sufficient to maintain the desired pitch setting of the blade under all normal flight conditions.

As to Figure 4, it may be pointed out that the arrangement therein shown makes possible application of the invention to the type of blade mounting incorporating a drag pivot. This adaptation may even be applied to existing equipment of this type.

I claim:

1. In an aircraft sustaining rotor having a hub and a blade, mechanism for mounting the blade on the hub including a housing having an enlarged inboard portion and an outboard extension of smaller diameter, a blade root fitting having an enlarged thrust carrying inboard portion, said fitting being in spaced telescopic relation with the narrower part of said housing and having its enlarged portion in bearing contact with an internal surface of said housing, and yieldable material interposed between said fitting and housing outboard of their enlarged portions and throughout a substantial length of their narrower cooperating portions.

2. In an aircraft sustaining rotor having a hub and a blade, mechanism for mounting the blade on the hub including a pair of inter-spaced telescopically associated members one of which is connected with the hub and the other of which is connected with the blade, the outer member being formed of separable parts the meeting lines of which extend generally axially of the blade, resilient material between said members for restricting their relative angular deflection, and cooperating interengaging centrifugal load transmitting bearing surfaces on said members.

3. In an aircraft sustaining rotor having a hub and a blade, mechanism for mounting the blade on the hub including a pair of inter-spaced telescopically associated members one of which is connected with the hub and the other of which is connected with the blade, resilient material between said members for restricting their relative angular deflection, and cooperating interengaging centrifugal load transmitting bearing surfaces on said members configured to provide line contact therebetween and thereby facilitate seating of said surfaces during relative angular deflection of said members.

4. In an aircraft sustaining rotor having a hub and a blade, mechanism for mounting the blade on the hub including a housing having an enlarged inboard portion and an outboard extension of smaller diameter, a blade root fitting having an enlarged thrust carrying inboard portion with a semi-cylindrical surface the axis of which is at an angle to the longitudinal blade axis, said fitting being in spaced telescopic relation with the narrower portion of said housing and having its semi-cylindrical surface in bearing contact with an internal surface of said housing, and yieldable material interposed between said fitting and housing throughout a substantial length of their telescoped portions.

5. In an aircraft sustaining rotor having a hub and a blade, mechanism for mounting the blade on the hub including a housing having an enlarged inboard portion with an annular internal bearing seat and an outboard extension of smaller diameter, a blade root fitting having an enlarged thrust carrying inboard enlargement of semi-spherical shape cooperating with said seat to carry the centrifugal load of the blade in flight, said fitting being in spaced telescopic relation with the narrower part of said housing, and yieldable material interposed between said fitting and housing outboard of their bearing portions and throughout a substantial length of their narrower cooperating portions.

6. In an aircraft sustaining rotor having a hub and a blade, mechanism for mounting the blade on the hub including a housing having an enlarged inboard portion and an outboard extension of smaller diameter removably fastened to said enlarged portion and having an annular bearing seat, a fitting in spaced telescopic relation with the narrower portion of said housing and having a bearing surface cooperating with said bearing seat, and yieldable material interposed between said fitting and housing.

HAROLD F. PITCAIRN.